United States Patent
Yoshida et al.

(10) Patent No.: US 7,181,904 B2
(45) Date of Patent: Feb. 27, 2007

(54) EXHAUST PURIFICATION DEVICE OF COMPRESSION IGNITION TYPE INTERNAL COMBUSTION ENGINE

(75) Inventors: Kohei Yoshida, Susono (JP); Shinya Hirota, Susono (JP); Yasuaki Nakano, Sunto-gun (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 22 days.

(21) Appl. No.: 10/535,896

(22) PCT Filed: Oct. 21, 2004

(86) PCT No.: PCT/JP2004/015954

§ 371 (c)(1),
(2), (4) Date: May 23, 2005

(87) PCT Pub. No.: WO2005/040571

PCT Pub. Date: May 6, 2005

(65) Prior Publication Data

US 2006/0064969 A1    Mar. 30, 2006

(30) Foreign Application Priority Data

Oct. 29, 2003    (JP)    ............................ 2003-369173

(51) Int. Cl.
*F01N 3/00*    (2006.01)
(52) U.S. Cl. ............................ 60/285; 60/276; 60/295; 60/297; 60/300; 60/303
(58) Field of Classification Search .................. 60/274, 60/276, 277, 285, 295, 297, 301, 303, 300
See application file for complete search history.

(56) References Cited

U.S. PATENT DOCUMENTS

| | | | |
|---|---|---|---|
| 5,472,673 A | 12/1995 | Goto et al. | |
| 5,473,890 A | 12/1995 | Takeshima et al. | |
| 6,145,303 A * | 11/2000 | Strehlau et al. | ............... 60/274 |
| 6,318,075 B1* | 11/2001 | Gunther et al. | ............... 60/285 |
| 6,482,377 B2* | 11/2002 | Bartley et al. | ............ 423/213.2 |
| 6,758,036 B1* | 7/2004 | Molinier | ...................... 60/286 |
| 6,938,411 B2* | 9/2005 | Hoffmann et al. | ............ 60/295 |
| 7,021,049 B2* | 4/2006 | Berris et al. | ................... 60/295 |
| 2003/0115856 A1 | 6/2003 | Surnilla et al. | |
| 2005/0170954 A1* | 8/2005 | Yoshida et al. | ............. 502/325 |

FOREIGN PATENT DOCUMENTS

| | | |
|---|---|---|
| EP | 1 030 043 A2 | 8/2000 |
| JP | A 06-173652 | 6/1994 |
| JP | A 06-272541 | 9/1994 |
| JP | A 07-217474 | 8/1995 |
| JP | A 2000-145436 | 5/2000 |
| JP | A 2001-152836 | 6/2001 |
| JP | A 2002-38930 | 2/2002 |

* cited by examiner

*Primary Examiner*—Tu M. Nguyen
(74) *Attorney, Agent, or Firm*—Oliff & Berridge, PLC

(57) ABSTRACT

An $SO_x$ trap catalyst (11) able to trap $SO_x$ contained in exhaust gas is arranged in an engine exhaust passage upstream of an $NO_x$ storing catalyst (12). When the $SO_x$ trap rate by the $SO_x$ trap catalyst (11) falls, the air-fuel ratio of the exhaust gas flowing into the $SO_x$ trap catalyst (11) is maintained lean and in that state the $SO_x$ trap catalyst (11) is raised in temperature. The $SO_x$ trapped at that time diffuses inside the $SO_x$ trap catalyst (11), whereby the $SO_x$ trap rate is restored.

10 Claims, 14 Drawing Sheets

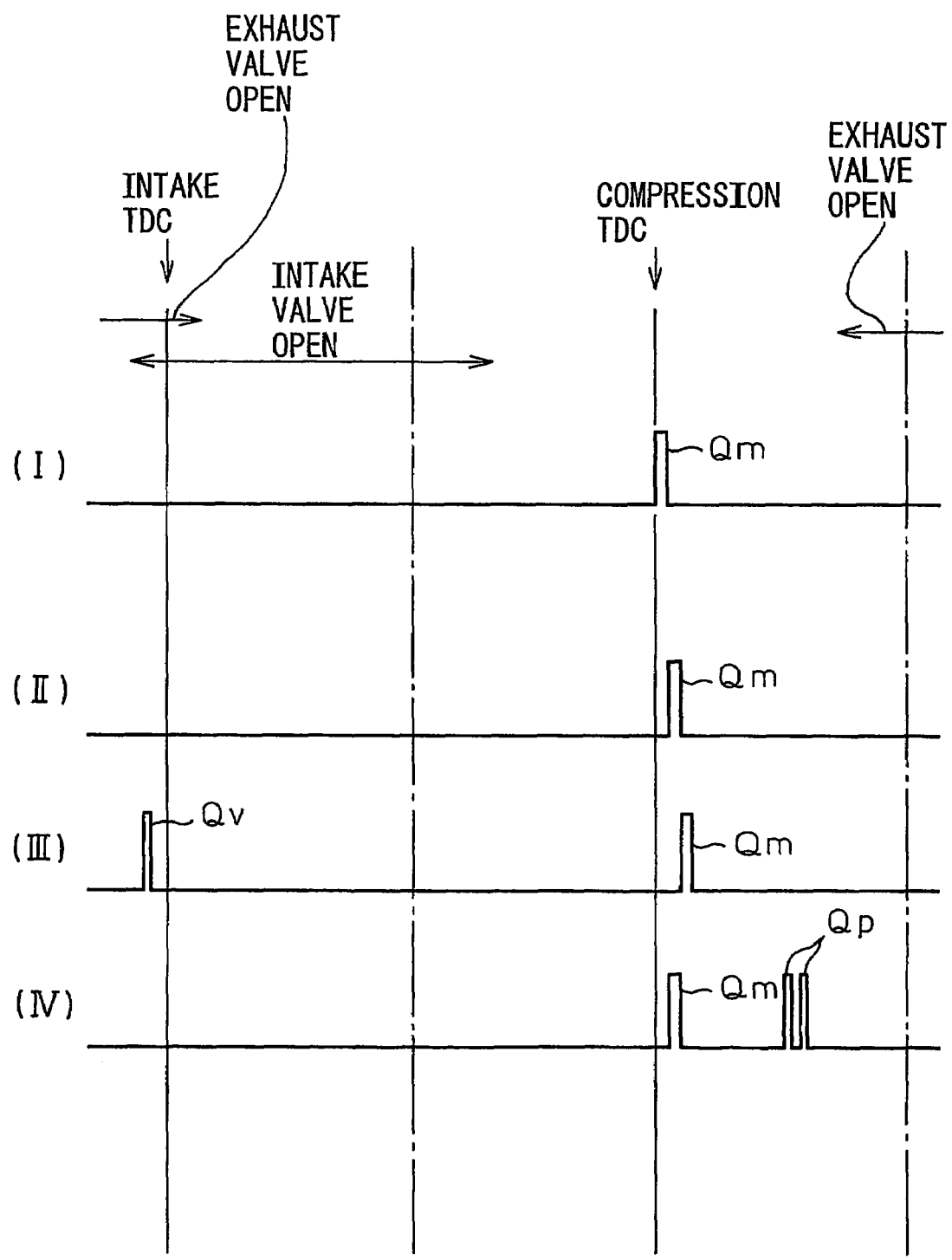

EXHAUST PURIFICATION DEVICE OF COMPRESSION IGNITION TYPE INTERNAL COMBUSTION ENGINE

TECHNICAL FIELD

The present invention relates to an exhaust purification device of a compression ignition type internal combustion engine.

BACKGROUND ART

Known in the art is an internal combustion engine having arranged in an engine exhaust passage an $NO_x$ storing catalyst which stores $NO_x$ contained in exhaust gas when the air-fuel ratio of the inflowing exhaust gas is lean and releases the stored $NO_x$ when the air-fuel ratio of the inflowing exhaust gas becomes the stoichiometric air-fuel ratio or rich. In this internal combustion engine, the $NO_x$ produced when burning fuel under a lean air-fuel ratio is stored in the $NO_x$ storing catalyst. On the other hand, when the $NO_x$ storing capability of the $NO_x$ storing catalyst approaches saturation, the air-fuel ratio of the exhaust gas is temporarily made rich and thereby the $NO_x$ is released from the $NO_x$ storing catalyst and reduced.

However, the fuel and lubrication oil contain sulfur. Therefore, the exhaust gas contains $SO_x$. This $SO_x$ is stored in the $NO_x$ storing catalyst along with the $NO_x$. However, this $SO_x$ is not released from the $NO_x$ storing catalyst just by making the air-fuel ratio of the exhaust gas rich. Therefore, the amount of $SO_x$ stored in the $NO_x$ storing catalyst gradually increases. As a result, the amount of $NO_x$ which can be stored ends up gradually decreasing.

Known in the art therefore is an internal combustion engine having an $SO_x$ absorbent arranged in the engine exhaust passage upstream of the $NO_x$ storing catalyst so as to prevent $SO_x$ from being sent to the $NO_x$ storing catalyst (see Japanese Unexamined Patent Publication (Kokai) No. 2000-145436). In this internal combustion engine, the $SO_x$ contained in the exhaust gas is absorbed by the $SO_x$ absorbent. Therefore, the $SO_x$ is prevented from flowing into the $NO_x$ storing catalyst. As a result, the storing capability of the $NO_x$ can be prevented from dropping due to storage of $SO_x$.

When using such an $SO_x$ absorbent, however, if the $SO_x$ absorption capability of the $SO_x$ absorbent ends up being saturated, the $SO_x$ will end up flowing into the $NO_x$ storing catalyst. With this $SO_x$ absorbent, however, if raising the temperature of the $SO_x$ absorbent and making the air-fuel ratio of the exhaust gas flowing into the $SO_x$ absorbent rich, it is possible to release the absorbed $SO_x$ from the $SO_x$ absorbent and therefore possible to restore the $SO_x$ absorbent. However, releasing $SO_x$ from the $SO_x$ absorbent in this way, the released $SO_x$ will end up being stored in the $NO_x$ storing catalyst. Therefore, in this internal combustion engine, a bypass passage bypassing the $NO_x$ storing catalyst is provided. When releasing $SO_x$ from the $SO_x$ absorbent, the released $SO_x$ is exhausted into the atmosphere through the bypass passage.

In the above $SO_x$ absorbent, by raising the temperature of the $SO_x$ absorbent and making the air-fuel ratio of the exhaust gas flowing into the $SO_x$ absorbent rich in this way, it is possible to release the $SO_x$ from the $NO_x$ absorbent. However, in this way, the $SO_x$ is only released from the $SO_x$ absorbent little by little. Therefore, for release of all of the absorbed $SO_x$ from the $SO_x$ absorbent, the air-fuel ratio must be made rich for a long time and therefore there is the problem that a large amount of fuel or a reducing agent becomes necessary. Further, the $SO_x$ released from the $SO_x$ absorbent is exhausted into the atmosphere. This is also not preferable.

In this way, when using an $SO_x$ absorbent, if the release of $SO_x$ is not controlled, limits end up arising in the $SO_x$ absorption capability. Therefore, when using an $SO_x$ absorbent, the release of $SO_x$ must be controlled. However, if the release of $SO_x$ is controlled, that is, so long as $SO_x$ is made to be released from the $SO_x$ absorbent, the above problem arises.

DISCLOSURE OF THE INVENTION

An object of the present invention is to provide an exhaust purification device of a compression ignition type internal combustion engine able to suppress the $SO_x$ release action from an $SO_x$ trap catalyst while maintaining the high $NO_x$ storing capability of an $NO_x$ storing catalyst.

According to the present invention, there is provided an exhaust purification device for a compression ignition type internal combustion engine having an $SO_x$ trap catalyst arranged in an engine exhaust passage and capable of trapping $SO_x$ contained in exhaust gas and having an $NO_x$ storing catalyst arranged in the exhaust passage downstream of the $SO_x$ trap catalyst, the $NO_x$ storing catalyst storing $NO_x$ contained in exhaust gas when the air-fuel ratio of the inflowing exhaust gas is lean and releasing the stored $NO_x$ when the air-fuel ratio of the exhaust gas flowing in becomes the stoichiometric air-fuel ratio or rich, wherein the $SO_x$ trap catalyst traps $SO_x$ contained in the exhaust gas when the air-fuel ratio of the exhaust gas flowing into the $SO_x$ trap catalyst is lean, has the property that the trapped $SO_x$ gradually diffuses inside the $SO_x$ trap catalyst when the temperature of the $SO_x$ trap catalyst rises under a lean air-fuel ratio of the exhaust gas, and has the property of releasing the trapped $SO_x$ when the air-fuel ratio of the exhaust gas flowing into the $SO_x$ trap catalyst becomes rich if the temperature of the $SO_x$ trap catalyst is the $SO_x$ release temperature or more; the device is provided with air-fuel ratio control means continuing to maintain the air-fuel ratio of the exhaust gas flowing into the $SO_x$ trap catalyst lean, without allowing it to become rich, during engine operation and estimating means for estimating an $SO_x$ trap rate showing a ratio of $SO_x$ trapped in the $SO_x$ trap catalyst and the $SO_x$ contained in the exhaust gas; and the device makes the temperature of the $SO_x$ trap catalyst rise under a lean air-fuel ratio of the exhaust gas when the $SO_x$ trap rate falls below a predetermined rate so as to thereby restore the $SO_x$ trap rate.

BRIEF DESCRIPTION OF THE DRAWINGS

FIG. 9 is a view showing an injection timing;

BEST MODE FOR CARRYING OUT THE INVENTION

Figure 1:
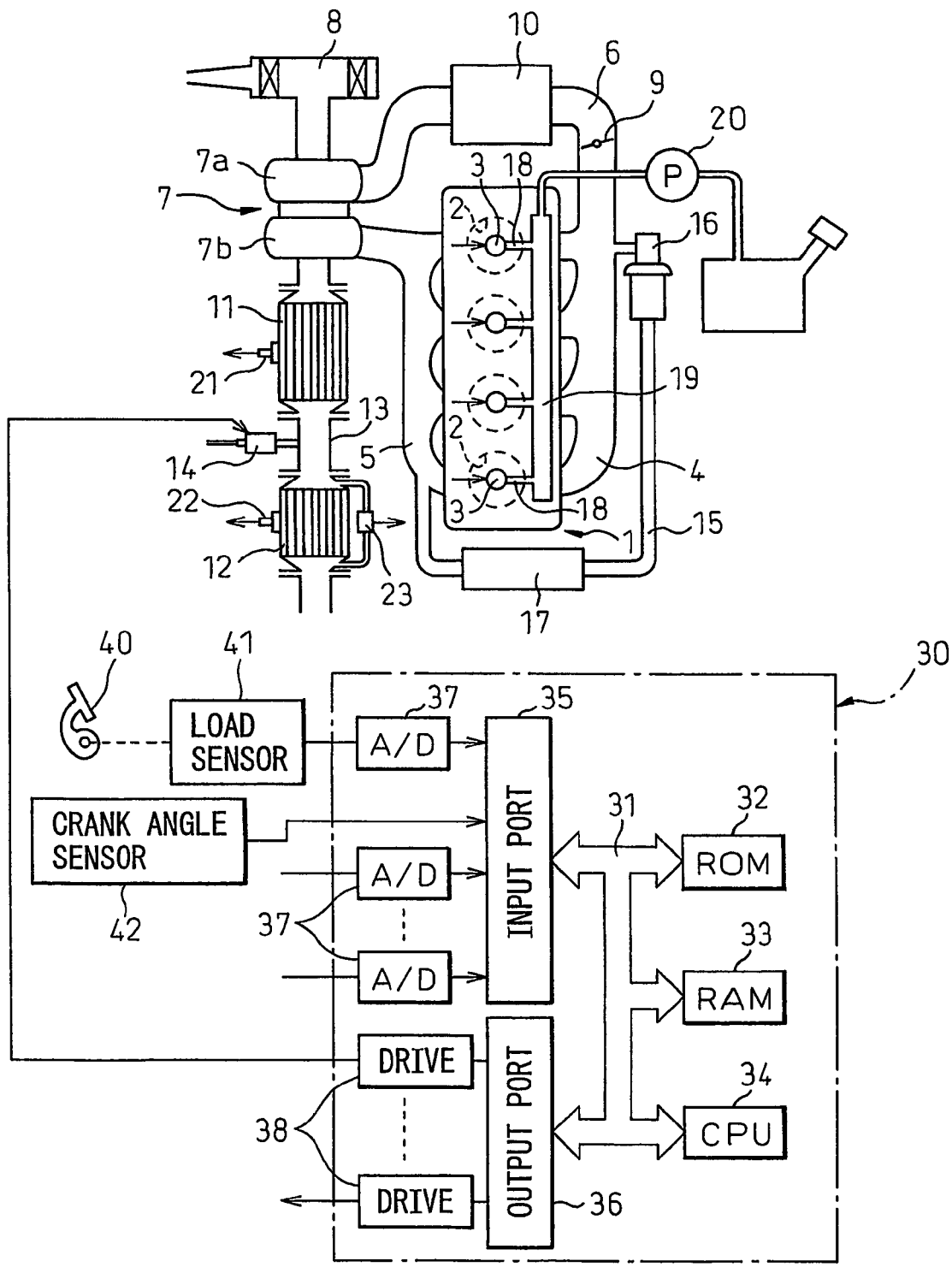
FIG. 1 is an overview of a compression ignition type internal combustion engine.

FIG. 1 shows an overview of a compression ignition type internal combustion engine.

Referring to FIG. 1, 1 indicates an engine body, 2 a combustion chamber of each cylinder, 3 an electronically controlled fuel injector for injecting fuel into each combustion chamber 2, 4 an intake manifold, and 5 an exhaust manifold. The intake manifold 4 is connected through an intake duct 6 to an outlet of a compressor 7a of an exhaust turbocharger 7. The inlet of the compressor 7a is connected to an air cleaner 8. Inside the intake duct 6 is arranged a throttle valve 9 driven by a step motor. Further, around the intake duct 6 is arranged a cooling device (intercooler) 10 for cooling the intake air flowing through the inside of the intake duct 6. In the embodiment shown in FIG. 1, the engine cooling water is guided into the cooling device 10. The engine cooling water cools the intake air. On the other hand, the exhaust manifold 5 is connected to an inlet of an exhaust turbine 7b of the exhaust turbocharger 7, while the outlet of the exhaust turbine 7b is connected to an inlet of an $SO_x$ trap catalyst 11. Further, the outlet of the $SO_x$ trap catalyst 11 is connected through an exhaust pipe 13 to an NOx storing catalyst 12. The exhaust pipe 13 is provided with a reducing agent supply valve 14 for supplying a reducing agent comprised of for example hydrocarbons into the exhaust gas flowing through the inside of the exhaust pipe 13.

The exhaust manifold 5 and the intake manifold 4 are interconnected through an exhaust gas recirculation (hereinafter referred to as an "EGR") passage 15. The EGR passage 15 is provided with an electronically controlled EGR control valve 16. Further, around the EGR passage 15 is arranged a cooling device 17 for cooling the EGR gas flowing through the inside of the EGR passage 15. In the embodiment shown in FIG. 1, the engine cooling water is guided into the cooling device 17. The engine cooling water cools the EGR gas. On the other hand, each fuel injector 3 is connected through a fuel feed tube 18 to a common rail 19. This common rail 19 is supplied with fuel from an electronically controlled variable discharge fuel pump 20. The fuel supplied into the common rail 19 is supplied through each fuel feed tube 18 to the fuel injector 3.

An electronic control unit 30 is comprised of a digital computer provided with a read only memory (ROM) 32, a random access memory (RAM) 33, a microprocessor (CPU) 34, an input port 35, and an output port 36 all connected to each other by a bidirectional bus 31. The $SO_x$ trap catalyst 11 is provided with a temperature sensor 21 for detecting the temperature of the $SO_x$ trap catalyst 11. The $NO_x$ storing catalyst 12 is provided with a temperature sensor 22 for detecting the temperature of the $NO_x$ storing catalyst 12. The output signals of the temperature sensors 21 and 22 are input through corresponding AD converters 37 to the input port 35. Further, the $NO_x$ storing catalyst 12 is provided with a differential pressure sensor 23 for detecting the differential pressure before and after the $NO_x$ storing catalyst 12. The output signal of the differential pressure sensor 23 is input through the corresponding AD converter 37 to the input port 35.

An accelerator pedal 40 has a load sensor 41 generating an output voltage proportional to the amount of depression L of the accelerator pedal 40 connected to it. The output voltage of the load sensor 41 is input through a corresponding AD converter 37 to the input port 35. Further, the input port 35 has a crank angle sensor 42 generating an output pulse each time the crankshaft turns for example by 15 degrees connected to it. On the other hand, the output port 36 is connected through corresponding drive circuits 38 to the fuel injectors 3, throttle valve 9 step motor, reducing agent supply valve 14, EGR control valve 16, and fuel pump 20.

Figure 2:
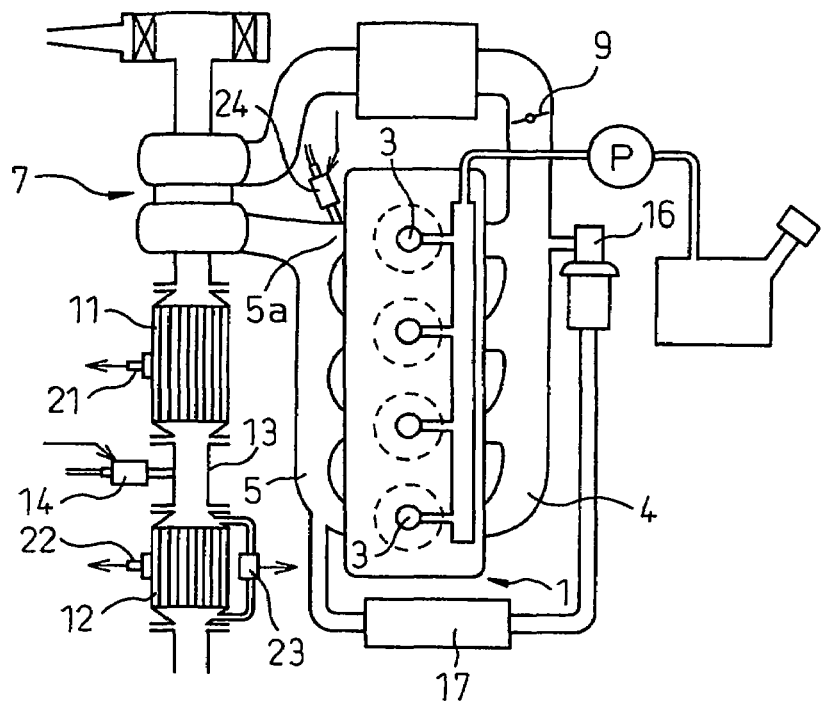
FIG. 2 is an overview of another embodiment of a compression ignition type internal combustion engine.

FIG. 2 shows another embodiment of a compression ignition type internal combustion engine. In this embodiment, in addition to the reducing agent supply valve 14 attached to the exhaust pipe 13, a manifold tube 5a of for example the #1 cylinder of the exhaust manifold 5 is provided with a hydrocarbon supply valve 24 for supplying for example hydrocarbons.

Figure 3:
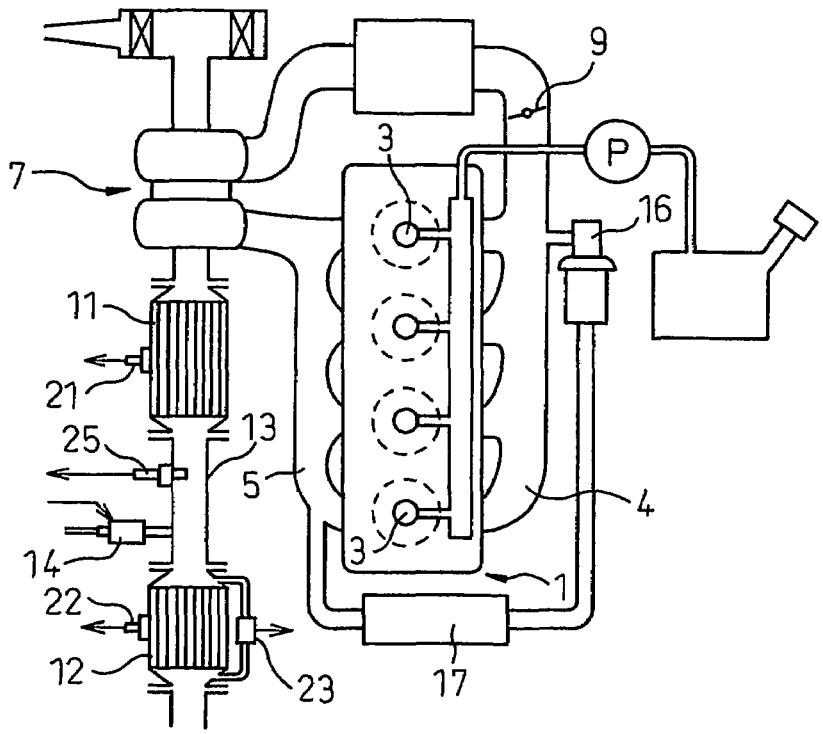
FIG. 3 is an overview of still another embodiment of a compression ignition type internal combustion engine.

On the other hand, FIG. 3 shows still another embodiment of a compression ignition type internal combustion engine. In this embodiment, the exhaust pipe 13 is provided with an $SO_x$ sensor 25 for detecting the concentration of $SO_x$ in the exhaust gas flowing out from the $SO_x$ trap catalyst 11.

First, explaining the $NO_x$ storing catalyst 12 shown in FIG. 1 to FIG. 3, the $NO_x$ storing catalyst 12 is carried on a three-dimensional mesh structure monolith carrier or pellet carriers or is carried on a honeycomb structure particulate filter. In this way, the $NO_x$ storing catalyst 12 can be carried on various types of carriers, but below, the explanation will be made of the case of carrying the $NO_x$ storing catalyst 12 on a particulate filter.

Figure 4A:
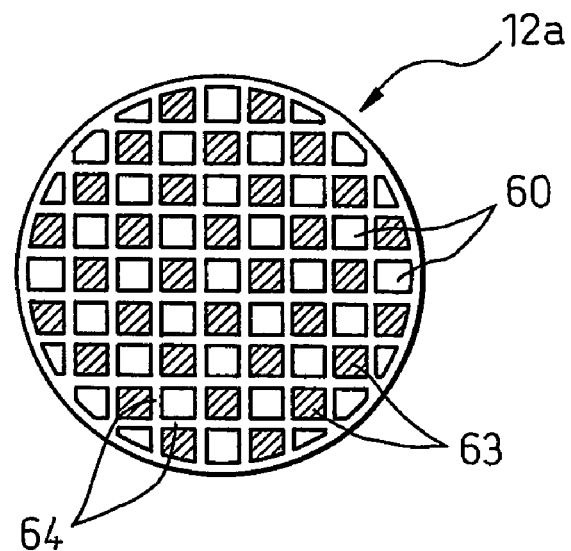
FIGS. 4A and 4B are views of the structure of a particulate filter.
Figure 4B:
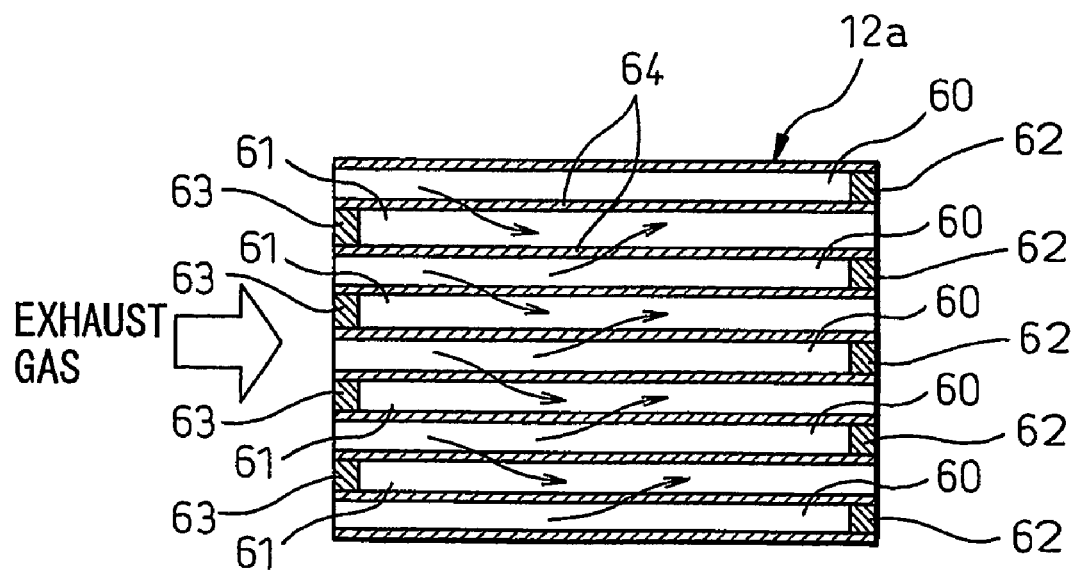

FIGS. 4A and 4B show the structure of the particulate filter 12a carrying the $NO_x$ storing catalyst 12. Note that FIG. 4A is a front view of the particulate filter 12a, while FIG. 4B is a side sectional view of the particulate filter 12a. As shown in FIGS. 4A and 4B, the particulate filter 12a forms a honeycomb structure and is provided with a plurality of exhaust passages 60 and 61 extending in parallel with each other. These exhaust passages are comprised by exhaust gas inflow passages 60 with downstream ends sealed by plugs 62 and exhaust gas outflow passages 61 with upstream ends sealed by plugs 63. Note that the hatched portions in FIG. 4A show plugs 63. Therefore, the exhaust gas inflow passages 60 and the exhaust gas outflow passages 61 are arranged alternately through thin wall partitions 64. In other words, the exhaust gas inflow passages 60 and the exhaust gas outflow passages 61 are arranged so that each exhaust gas inflow passage 60 is surrounded by four exhaust gas outflow passages 61, and each exhaust gas outflow passage 61 is surrounded by four exhaust gas inflow passages 60.

The particulate filter 12a is formed from a porous material such as for example cordierite. Therefore, the exhaust gas flowing into the exhaust gas inflow passages 60 flows out into the adjoining exhaust gas outflow passages 61 through the surrounding partitions 64 as shown by the arrows in FIG. 4B.

Figure 5:
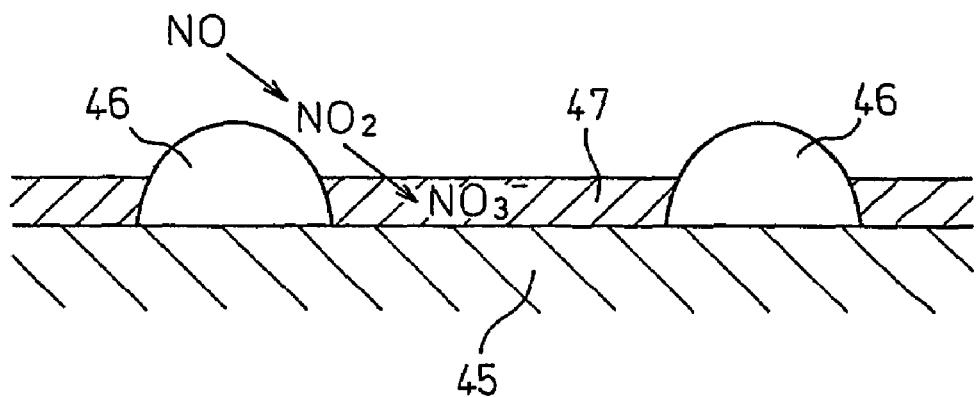
FIG. 5 is a sectional view of a surface part of catalyst carrier of an $NO_x$ storing catalyst.

When the $NO_x$ storing catalyst 12 is carried on the particulate filter 12a in this way, the peripheral walls of the exhaust gas inflow passages 60 and exhaust gas outflow passages 61, that is, the surfaces of the two sides of the partitions 64 and inside walls of the fine holes of the partitions 64 carry a catalyst carrier comprised of alumina. FIG. 5 schematically shows the cross-section of the surface part of this catalyst carrier 45. As shown in FIG. 5, the catalyst carrier 45 carries a precious metal catalyst 46 diffused on its surface. Further, the catalyst carrier 45 is formed with a layer of an $NO_x$ absorbent 47 on its surface.

In this embodiment of the present invention, platinum Pt is used as the precious metal catalyst 46. As the ingredient forming the $NO_x$ absorbent 47, for example, at least one element selected from potassium K, sodium Na, cesium Cs, or another alkali metal, barium Ba, calcium Ca, or another alkali earth, lanthanum La, yttrium Y, or another rare earth may be used.

If the ratio of the air and fuel (hydrocarbons) supplied to the engine intake passage, combustion chambers 2, and exhaust passage upstream of the $NO_x$ storing catalyst 12 is referred to as the "air-fuel ratio of the exhaust gas", the $NO_x$ absorbent 47 performs an $NO_x$ absorption and release action of storing the $NO_x$ when the air-fuel ratio of the exhaust gas is lean and releasing the stored $NO_x$ when the oxygen concentration in the exhaust gas falls.

That is, if explaining this taking as an example the case of using barium Ba as the ingredient forming the $NO_x$ absorbent 47, when the air-fuel ratio of the exhaust gas is lean, that is, when the oxygen concentration in the exhaust gas is high, the NO contained in the exhaust gas is oxidized on the platinum Pt 46 such as shown in FIG. 5 to become $NO_2$, then is absorbed in the $NO_x$ absorbent 47 and diffuses in the $NO_x$ absorbent 47 in the form of nitric acid ions $NO_3^-$ while bonding with the barium oxide BaO. In this way, the $NO_x$ is absorbed in the $NO_x$ absorbent 47. So long as the oxygen concentration in the exhaust gas is high, $NO_2$ is produced on the surface of the platinum Pt 46. So long as the $NO_x$ absorbing capability of the $NO_x$ absorbent 47 is not saturated, the $NO_2$ is absorbed in the $NO_x$ absorbent 47 and nitric acid ions $NO_3^-$ are produced.

As opposed to this, by supplying a reducing agent from the reducing agent supply valve 14 to make the air-fuel ratio of the exhaust gas rich or the stoichiometric air-fuel ratio, since the oxygen concentration in the exhaust gas falls, the reaction proceeds in the reverse direction ($NO_3^- \rightarrow NO_2$) and therefore the nitric acid ions $NO_3^-$ in the $NO_x$ absorbent 47 are released from the $NO_x$ absorbent 47 in the form of $NO_2$. Next, the released $NO_x$ is reduced by the unburned hydrocarbons or CO included in the exhaust gas.

In this way, when the air-fuel ratio of the exhaust gas is lean, that is, when burning fuel under a lean air-fuel ratio, the $NO_x$ in the exhaust gas is absorbed in the $NO_x$ absorbent 47. However, if continuing to burn fuel under a lean air-fuel ratio, during that time the $NO_x$ absorbing capability of the $NO_x$ absorbent 47 will end up becoming saturated and therefore $NO_x$ will end up no longer being able to be absorbed by the $NO_x$ absorbent 47. Therefore, in this embodiment according to the present invention, before the absorbing capability of the $NO_x$ absorbent 47 becomes saturated, a reducing agent is supplied from the reducing agent supply valve 14 so as to temporarily make the air-fuel ratio of the exhaust gas rich and thereby release the $NO_x$ from the $NO_x$ absorbent 47.

However, exhaust gas contains $SO_x$, that is, $SO_2$. When this $SO_2$ flows into the $NO_x$ storing catalyst 12, this $SO_2$ is oxidized at the platinum Pt 46 and becomes $SO_3$. Next, this $SO_2$ is absorbed in the $NO_x$ absorbent 47 and bonds with the barium oxide BaO while diffusing in the $NO_x$ absorbent 47 in the form of sulfate ions $SO_4^{2-}$ to produce the stable sulfate $BaSO_4$. However, the $NO_x$ absorbent 47 has a strong basicity, so this sulfate $BaSO_4$ is stable and hard to decompose. If just making the air-fuel ratio of the exhaust gas rich, the sulfate $BaSO_4$ will remain without being decomposed. Therefore, in the $NO_x$ absorbent 47, the sulfate $BaSO_4$ will increase along with the elapse of time and therefore the amount of $NO_x$ which the $NO_x$ absorbent 47 can absorb will fall along with the elapse of time.

In this case, however, as explained at the start, if raising the temperature of the $NO_x$ storing catalyst 11 to the $SO_x$ release temperature of 600° C. or more and in that state making the air-fuel ratio of the exhaust gas flowing into the $NO_x$ storing catalyst 11 rich, $SO_x$ will be released from the $NO_x$ absorbent 47. However, in this case, $SO_x$ will only be released from the $NO_x$ absorbent 47 a little at a time. Therefore, for release of all of the absorbed $SO_x$ from the $SO_x$ absorbent 47, the air-fuel ratio must be made rich for a long time and therefore there is the problem that a large amount of fuel or a reducing agent becomes necessary. Further, the $SO_x$ released from the $SO_x$ absorbent 47 is exhausted into the atmosphere. This is also not preferable.

Therefore, in the present invention, an $SO_x$ trap catalyst is arranged upstream of the $NO_x$ storing catalyst 12 and this $SO_x$ trap catalyst 11 is used to trap the $SO_x$ contained in the exhaust gas and thereby prevent $SO_x$ from flowing into the $NO_x$ storing catalyst 12. Next, this $SO_x$ trap catalyst 11 will be explained.

Figure 6:
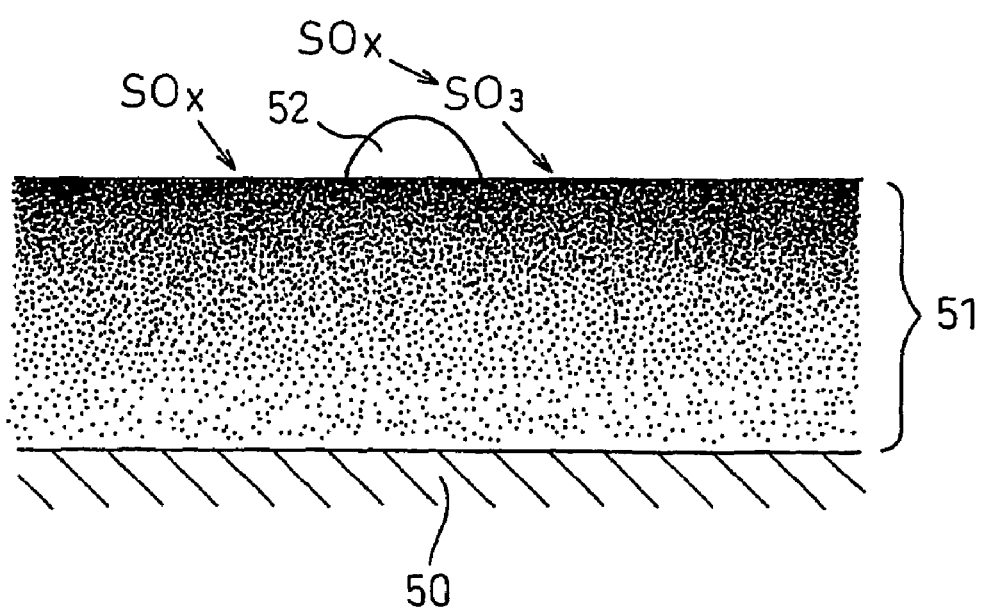
FIG. 6 is a sectional view of a surface part of a catalyst carrier of an $SO_x$ trap catalyst.

The $SO_x$ trap catalyst 11 is comprised of for example a honeycomb structure monolithic catalyst and has a large number of exhaust gas through holes extending straight in the axial direction of the $SO_x$ trap catalyst 11. When forming the $SO_x$ trap catalyst 11 from a honeycomb structure monolithic catalyst in this way, the inside peripheral walls of the exhaust gas through holes carry a catalyst carrier comprised of for example alumina. FIG. 6 schematically shows the cross-section of the surface part of this catalyst carrier 50. As shown in FIG. 6, the catalyst carrier 50 is formed with a coated layer 51 on its surface. Further, the coated layer 51 carries a precious metal catalyst 52 diffused on its surface.

In this embodiment of the present invention, platinum Pt is used as the precious metal catalyst 52. As the ingredient forming the coated layer 51, for example, at least one element selected from potassium K, sodium Na, cesium Cs, or another alkali metal, barium Ba, calcium Ca, or another alkali earth, lanthanum La, yttrium Y, or another rare earth may be used. That is, the coated layer 51 of the $SO_x$ trap catalyst 11 exhibits a strong basicity.

Therefore, the $SO_x$ contained in the exhaust gas, that is, the $SO_2$, is oxidized at the platinum 52 as shown in FIG. 6, then is trapped in the coated layer 51. That is, the $SO_2$ diffuses in the coated layer 51 in the form of sulfate ions $SO_4^{2-}$ to form a sulfate. Note that as explained above, the coated layer 51 exhibits a strong basicity. Therefore, part of the $SO_2$ contained in the exhaust gas is directly trapped in the coated layer 51 as shown in FIG. 5.

The concentration in the coated layer 51 in FIG. 6 shows the concentration of trapped $SO_x$. As will be understood from FIG. 6, the concentration of $SO_x$ in the coated layer 51 is highest near the surface of the coated layer 51 and gradually becomes lower the further deeper. If the $SO_x$ concentration near the surface of the coated layer 51 becomes high, the basicity of the surface of the coated layer 51 becomes weaker and the $SO_x$ trap capability becomes weaker. Therefore, if the percentage of the $SO_x$ trapped by the $SO_x$ trap catalyst 11 in the $SO_x$ contained in the exhaust gas is referred to as the "$SO_x$ trap rate", the $SO_x$ trap rate falls along with the basicity of the surface of the coated layer 51 becoming weaker.

Figure 7:
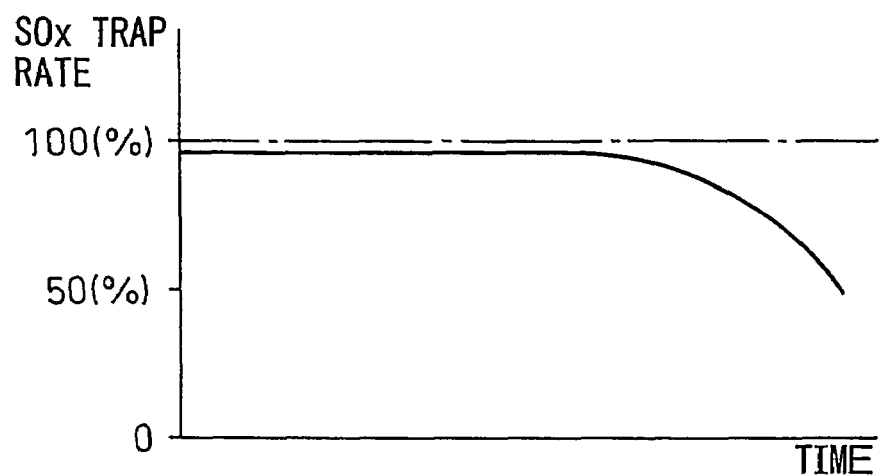
FIG. 7 is a view of an $SO_x$ trap rate.
Figure 8:
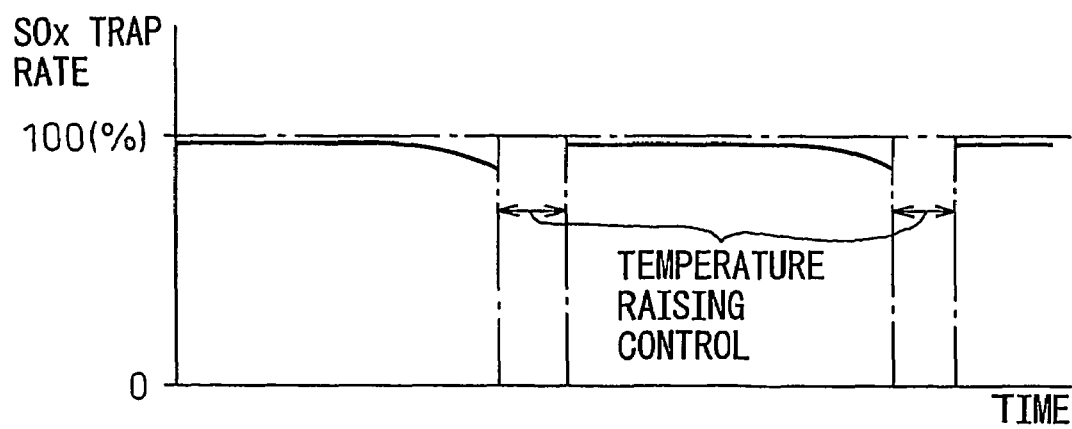
FIG. 8 is a view for explaining temperature raising control.

FIG. 7 shows the changes in the $SO_x$ trap rate along with time. As shown in FIG. 7, the $SO_x$ trap rate is first close to 100 percent, but rapidly falls along with the elapse of time. Therefore, in the present invention, as shown in FIG. 8, when the $SO_x$ trap rate falls below a predetermined rate, temperature raising control is performed to raise the temperature of the $SO_x$ trap catalyst 11 under a lean air-fuel ratio of the exhaust gas and thereby restore the $SO_x$ trap rate.

That is, if raising the temperature of the $SO_x$ trap catalyst 11 under a lean air-fuel ratio of the exhaust gas, the $SO_x$ concentrated near the surface of the coated layer 51 diffuses toward the deep part of the coated layer 51 so that the $SO_x$ concentration in the coated layer 51 becomes even. That is, the sulfate produced in the coated layer 51 changes from an unstable state concentrated near the surface of the coated layer 51 to a stable state evenly diffused across the entirety of the inside of the coated layer 51. If the $SO_x$ present near the surface of the coated layer 51 diffuses toward the deep part of the coated layer 51, the concentration of $SO_x$ near the surface of the coated layer 51 will fall. Therefore, when the temperature raising control of the $SO_x$ trap catalyst 11 is completed, the $SO_x$ trap rate will be restored as shown in FIG. 8.

When performing temperature raising control of the $SO_x$ trap catalyst 11, if making the temperature of the $SO_x$ trap catalyst 11 substantially 450° C. or so, the $SO_x$ present near the surface of the coated layer 51 can be made to diffuse in the coated layer 51. If raising the temperature of the $SO_x$ trap catalyst 11 to about 600° C., the concentration of $SO_x$ in the coated layer 51 can be made considerably even. Therefore, at the time of temperature raising control of the $SO_x$ trap catalyst 11, it is preferable to raise the temperature of the $SO_x$ trap catalyst 11 to about 600° C. under a lean air-fuel ratio of the exhaust gas.

Note that when raising the temperature of the $SO_x$ trap catalyst 11, if making the air-fuel ratio of the exhaust gas rich, $SO_x$ will end up being released from the $SO_x$ trap catalyst 11. Therefore, when raising the temperature of the $SO_x$ trap catalyst 11, the air-fuel ratio of the exhaust gas may not be made rich. Further, when the concentration of $SO_x$ near the surface of the coated layer 51 becomes high, even if not raising the temperature of the $SO_x$ trap catalyst 11, if making the air-fuel ratio of the exhaust gas rich, $SO_x$ will end up being released from the $SO_x$ trap catalyst 11. Therefore, in the present invention, when the temperature of the $SO_x$ trap catalyst 11 is the $SO_x$ release temperature or more, the air-fuel ratio of the exhaust gas flowing into the $SO_x$ trap catalyst 11 is prevented from being made rich.

In the present invention, basically, it is assumed that the $SO_x$ trap catalyst 11 will be used as it is without replacement from the time of purchase of the vehicle to its end of life. In recent years, the amount of sulfur contained in fuel in particularly has been reduced. Therefore, if the capacity of the $SO_x$ trap catalyst 11 is made larger to a certain extent, the $SO_x$ trap catalyst 11 can be used as it is until the end of life of the vehicle without replacement. For example, if the potential running distance of a vehicle is 500,000 km, the capacity of the $SO_x$ trap catalyst 11 is made a capacity enabling $SO_x$ to continue to be trapped by a high $SO_x$ trap rate without temperature raising control until about 250,000 km. In this case, the initial temperature raising control is performed at about 250,000 km.

Next, the method of raising the temperature of the $SO_x$ trap catalyst 11 will be explained with reference to FIG. 9.

One of the effective methods for raising the temperature of the $SO_x$ trap catalyst 11 is the method of retarding the fuel injection timing until after compression top dead center. That is, normally, the main fuel $Q_m$ is, in FIG. 9, injected near compression top dead center as shown in (I). In this case, as shown in (II) of FIG. 9, if the injection timing of the main fuel $Q_m$ is retarded, the after burning period will become longer and therefore the exhaust gas temperature will rise. If the exhaust gas temperature rises, the temperature of the $SO_x$ trap catalyst 11 will rise along with it.

Further, to raise the temperature of the $SO_x$ trap catalyst 11, as shown in (III) of FIG. 9, it is also possible to inject supplementary fuel $Q_v$ near intake top dead center in addition to the main fuel $Q_m$. If additionally injecting supplementary fuel $Q_v$ in this way, the fuel which is burned is increased by exactly the amount of the supplementary fuel $Q_v$, so the exhaust gas temperature rises and therefore the temperature of the $SO_x$ trap catalyst 11 rises.

On the other hand, if injecting supplementary fuel $Q_v$ near intake top dead center in this way, aldehydes, ketones, peroxides, carbon monoxide, and other intermediate products are produced from the supplementary fuel $Q_v$ due to the heat of compression during the compression stroke. These intermediate products accelerate the reaction of the main fuel $Q_m$. Therefore, in this case, as shown by (III) of FIG. 9, even if the injection timing of the main fuel $Q_m$ is greatly retarded, good combustion will be obtained without misfires. That is, it is possible to greatly retard the injection timing of the main fuel $Q_m$, so the exhaust gas temperature will become considerably high and therefore the temperature of the $SO_x$ trap catalyst 11 can be quickly raised.

Further, to raise the temperature of the $SO_x$ trap catalyst 11, as shown in (IV) of FIG. 9, it is also possible to inject supplementary fuel $Q_p$ during the expansion stroke or exhaust stroke in addition to the main fuel $Q_m$. That is, in this case, the major part of the supplementary fuel $Q_p$ is not burned and is exhausted into the exhaust passage in the form of unburned hydrocarbons. The unburned hydrocarbons are oxidized by the excess oxygen on the $SO_x$ trap catalyst 11. The heat of oxidation reaction arising at that time raises the temperature of the $SO_x$ trap catalyst 11.

On the other hand, in the internal combustion engine shown in FIG. 2, it is also possible to supply hydrocarbons from the hydrocarbon supply valve 24 and use the heat of oxidation reaction of the hydrocarbons to raise the temperature of the $SO_x$ trap catalyst 11. Further, it is possible to perform any of the injection control routines shown from (II) to (IV) of FIG. 9 and supply hydrocarbons from the hydrocarbon supply valve 24. Note that no matter which method is used to raise the temperature, the air-fuel ratio of the exhaust gas flowing into the $SO_x$ trap catalyst 11 is not made rich, but is maintained lean.

Next, a first embodiment of the $SO_x$ stabilization processing at the $SO_x$ trap catalyst 11 will be explained while referring to FIG. 10A to FIG. 12.

In the first embodiment, the amount of $SO_x$ trapped by the $SO_x$ trap catalyst 11 is estimated. When the amount of $SO_x$ trapped by the $SO_x$ trap catalyst 11 exceeds a predetermined amount, it is judged that the $SO_x$ trap rate has fallen lower than the predetermined rate. At this time, to restore the $SO_x$ trap rate, the temperature of the $SO_x$ trap catalyst 11 is raised under a lean air-fuel ratio of the exhaust gas in temperature raising control.

Figure 10A:
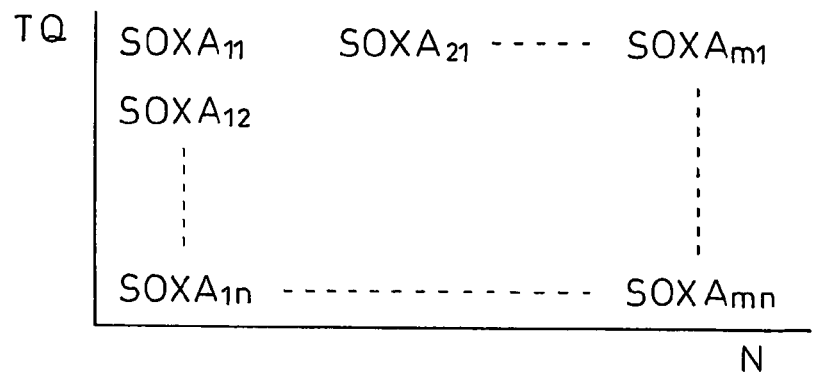
FIGS. 10A to 10C are views of the relationship between a stored $SO_x$ amount $\Sigma SOX1$ and a stored $SO_x$ amount $SO(n)$ for temperature raising control etc.

That is, fuel contains a certain ratio of sulfur. Therefore, the amount of $SO_x$ contained in the exhaust gas, that is, the amount of $SO_x$ trapped by the $SO_x$ trap catalyst 11, is proportional to the fuel injection amount. The fuel injection amount is a function of the required torque and the engine speed. Therefore, the amount of $SO_x$ trapped by the $SO_x$ trap catalyst 11 also becomes a function of the required torque and the engine speed. In this embodiment of the present invention, the $SO_x$ amount SOXA trapped per unit time in the $SO_x$ trap catalyst 11 is stored as a function of the required torque TQ and the engine speed N in the form of a map as shown in FIG. 10A in advance in the ROM 32.

Figure 10B:
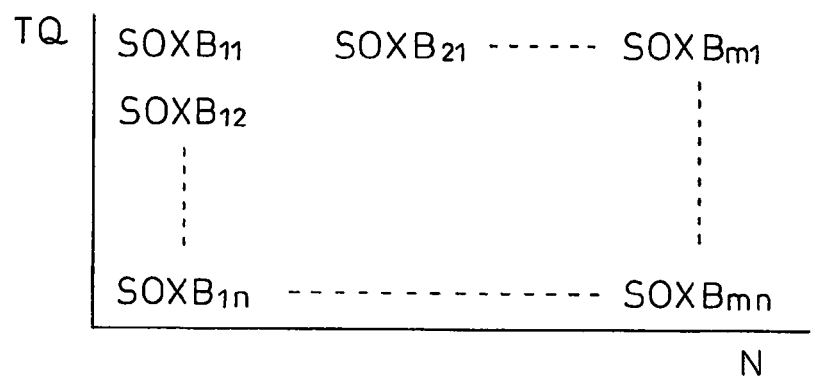

Further, lubrication oil contains a certain ratio of sulfur. The amount of lubrication oil burned in a combustion chamber 2, that is, the amount of $SO_x$ contained in the exhaust gas and trapped in the $SO_x$ trap catalyst 11, becomes a function of the required torque and the engine speed. In this embodiment of the present invention, the amount SOXB of $SO_x$ contained in the lubrication oil and trapped per unit time in the $SO_x$ trap catalyst 11 is stored as a function of the required torque TQ and the engine speed N in the form of a map as shown in FIG. 10B in advance in the ROM 32. By cumulatively adding the $SO_x$ amount SOXA and the $SO_x$ amount SOXB, the $SO_x$ amount $\Sigma SOX1$ trapped in the $SO_x$ trap catalyst 11 is calculated.

Figure 10C:
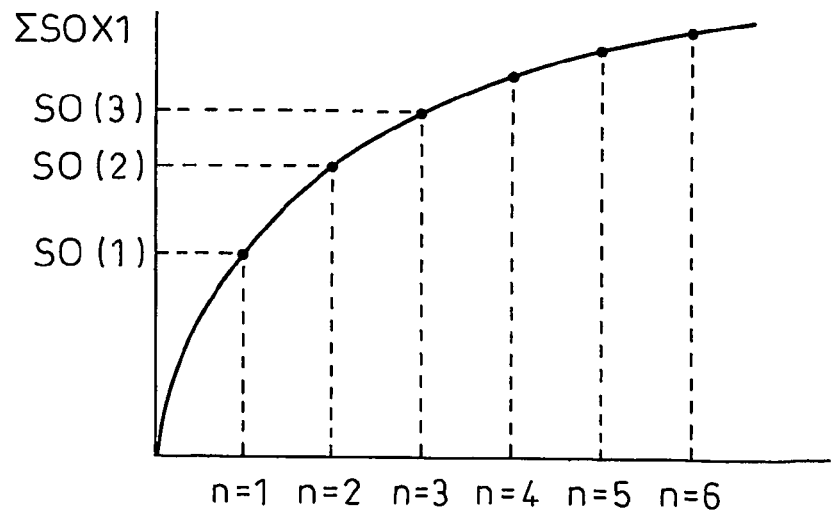

Further, in this embodiment of the present invention, as shown in FIG. 10C, the relationship between the $SO_x$ amount $\Sigma SOX1$ and the predetermined $SO_x$ amount SO(n) when raising the temperature of the $SO_x$ trap catalyst 11 is stored in advance. When the $SO_x$ amount $\Sigma SOX1$ exceeds the predetermined SO(n) (n=1, 2, 3, . . . ), temperature raising control of the $SO_x$ trap catalyst 11 is performed. Note that in FIG. 10C, n shows the number of times of the temperature raising processing. As will be understood from FIG. 10C, as the number of times n of temperature raising processing for restoring the $SO_x$ trap rate increases, the predetermined amount SO(n) is increased. The rate of increase of the predetermined amount SO(n) is reduced the greater the number of times n of processing. That is, the rate of increase of SO(d) to SO(2) is reduced from the rate of increase of SO(2) to SO(1).

Figure 11:
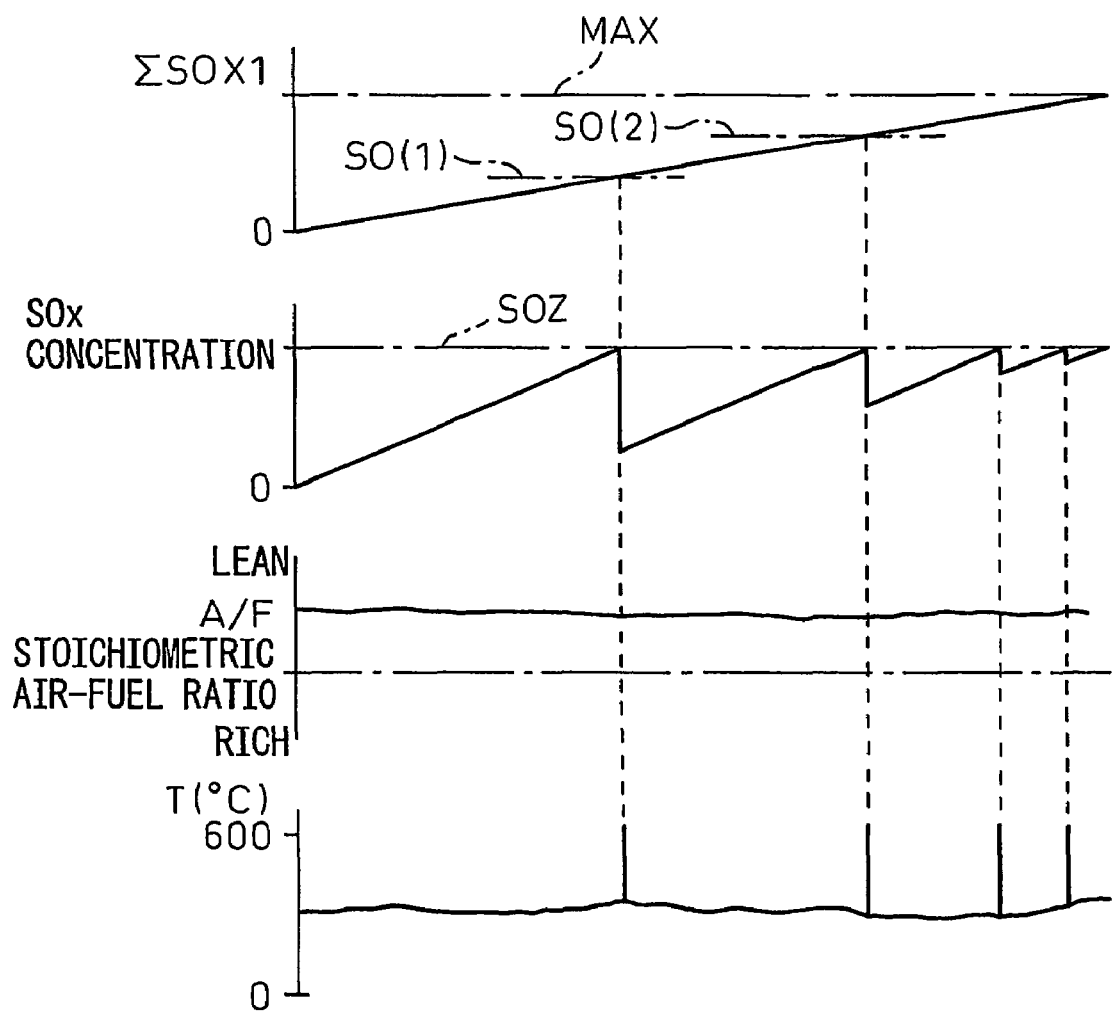
FIG. 11 is a time chart of changes in the stored $SO_x$ amount $\Sigma SOX1$ etc.

That is, as shown by the time chart of FIG. 11, the amount $\Sigma SOX1$ of $SO_x$ trapped by the $SO_x$ trap catalyst 11 continues to increase along with the elapse of time until the allowable value MAX. Note that in FIG. 11, the time when $\Sigma SOX1=MAX$ is the time of the running distance of about 500,000 km.

On the other hand, in FIG. 11, the concentration of $SO_x$ shows the concentration of $SO_x$ near the surface of the $SO_x$ trap catalyst 11. As will be understood from FIG. 11, when the concentration of $SO_x$ near the surface of the $SO_x$ trap catalyst 11 exceeds the allowable value SOZ, the temperature T of the $SO_x$ trap catalyst 11 is raised under a lean air-fuel ratio A/F of the exhaust gas in the temperature raising control. When the temperature raising control is performed, the concentration of $SO_x$ near the surface of the $SO_x$ trap catalyst 11 falls, but the amount of reduction of the $SO_x$ concentration becomes smaller with each temperature raising control routine. Therefore, the period from when one temperature raising control routine is performed to the next temperature raising control is performed becomes shorter with each temperature raising control routine.

Note that as shown in FIG. 11, the trapped $SO_x$ amount $\Sigma SOX1$ reaching SO(1), S0(2), . . . means the concentration of $SO_x$ near the surface of the $SO_x$ trap catalyst 11 reaching the allowable value SOZ.

Figure 12:
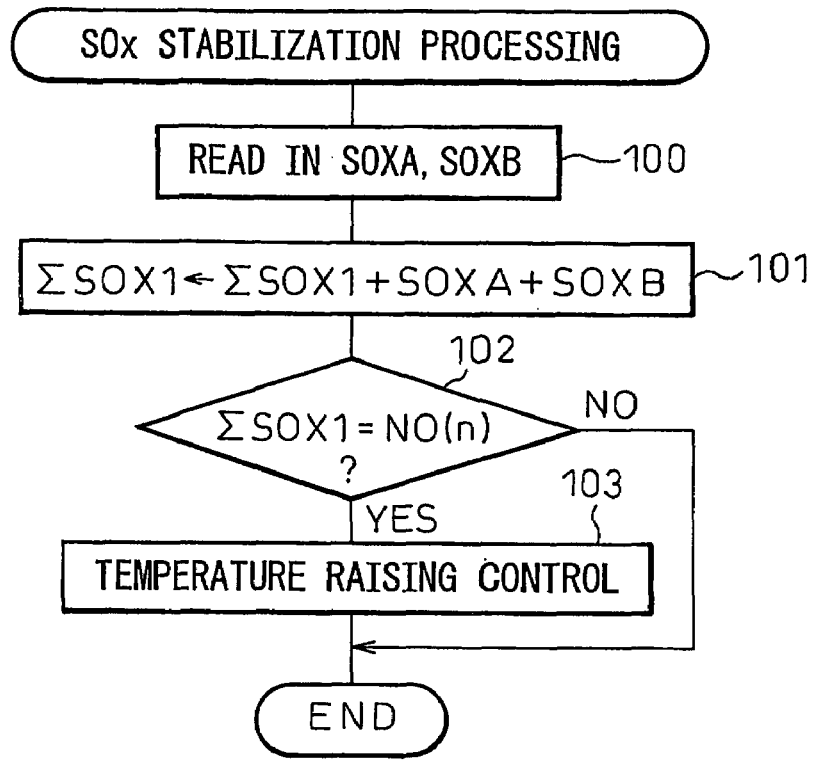
FIG. 12 is a flow chart for working a first embodiment of $SO_x$ stabilization processing.

FIG. 12 shows the routine for working the first embodiment of the $SO_x$ stabilization processing.

Referring to FIG. 12, first, at step 100, the amounts SOXA and SOXB of the $SO_x$ trapped per unit time are read from FIG. 10A and FIG. 10B. Next, at step 101, the sum of these SOXA and SOXB is added to the $SO_x$ amount $\Sigma SOX1$. Next, at step 102, it is judged if the $SO_x$ amount $\Sigma SOX1$ has reached the predetermined amount SO(n) (n=1, 2, 3, . . . ) shown in FIG. 10C. When the $SO_x$ amount $\Sigma SOX1$ has reached the predetermined amount SO(n), the routine proceeds to step 103, where temperature raising control is performed.

Figure 13:
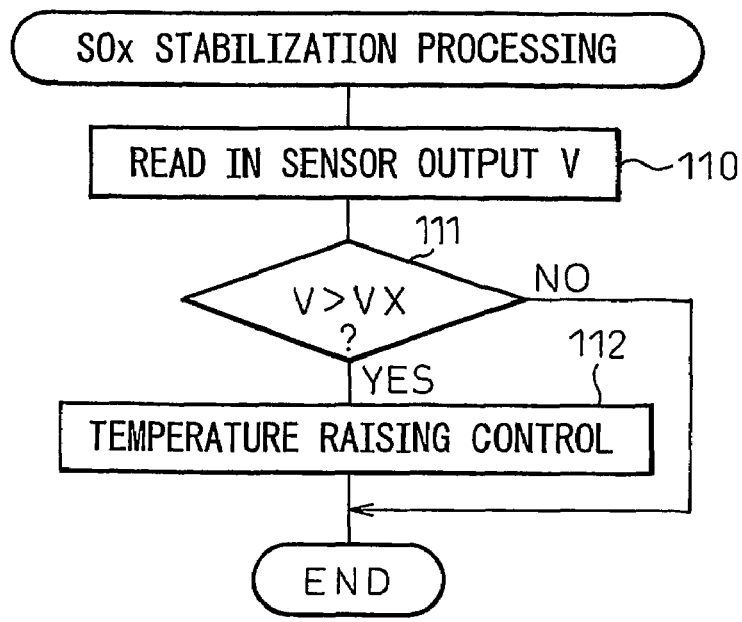
FIG. 13 is a flow chart for working a second embodiment of $SO_x$ stabilization processing.
Figure 14:
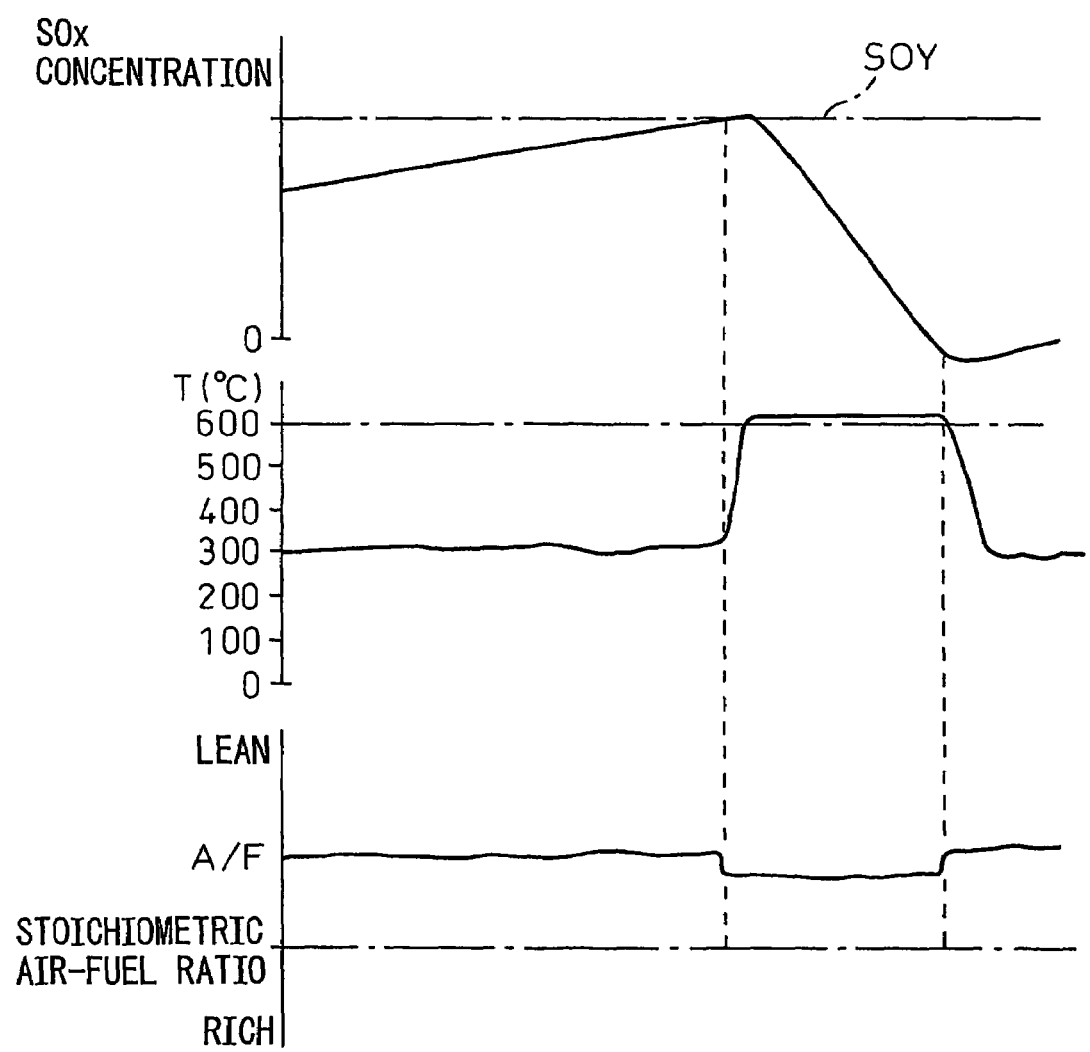
FIG. 14 is a time chart of $SO_x$ stabilization processing.

FIG. 13 and FIG. 14 show a second embodiment of the $SO_x$ stabilization processing. In this embodiment, as shown in FIG. 3, the $SO_x$ sensor 25 is arranged downstream of the $SO_x$ trap catalyst 11. This $SO_x$ sensor 25 detects the concentration of $SO_x$ in the exhaust gas flowing out from the $SO_x$ trap catalyst 11. That is, in the second embodiment, as shown in FIG. 14, when the concentration of $SO_x$ in the exhaust gas detected by the $SO_x$ sensor 25 exceeds the predetermined concentration SOY, it is judged that the $SO_x$ trap rate has fallen below the predetermined rate. At that time, to restore the $SO_x$ trap rate, the temperature T of the $SO_x$ trap catalyst 11 is raised under a lean air-fuel ratio A/F of the exhaust gas in the temperature raising control.

FIG. 13 shows the routine for working the second embodiment.

Referring to FIG. 13, first, at step 100, the output signal of the $SO_x$ sensor 25, for example, the output voltage V, is read. Next, at step 111, it is judged whether the power voltage V of the $SO_x$ sensor 25 has exceeded a setting VX, that is, if the concentration of $SO_x$ in the exhaust gas has exceeded the predetermined concentration SOY. When V>VX, that is, when the concentration of $SO_x$ in the exhaust gas has exceeded the predetermined concentration SOY, the routine proceeds to step 112, where the temperature raising control is performed.

Next, the processing for the $NO_x$ storing catalyst 12 will be explained while referring to FIG. 15 to FIG. 18.

Figure 15:
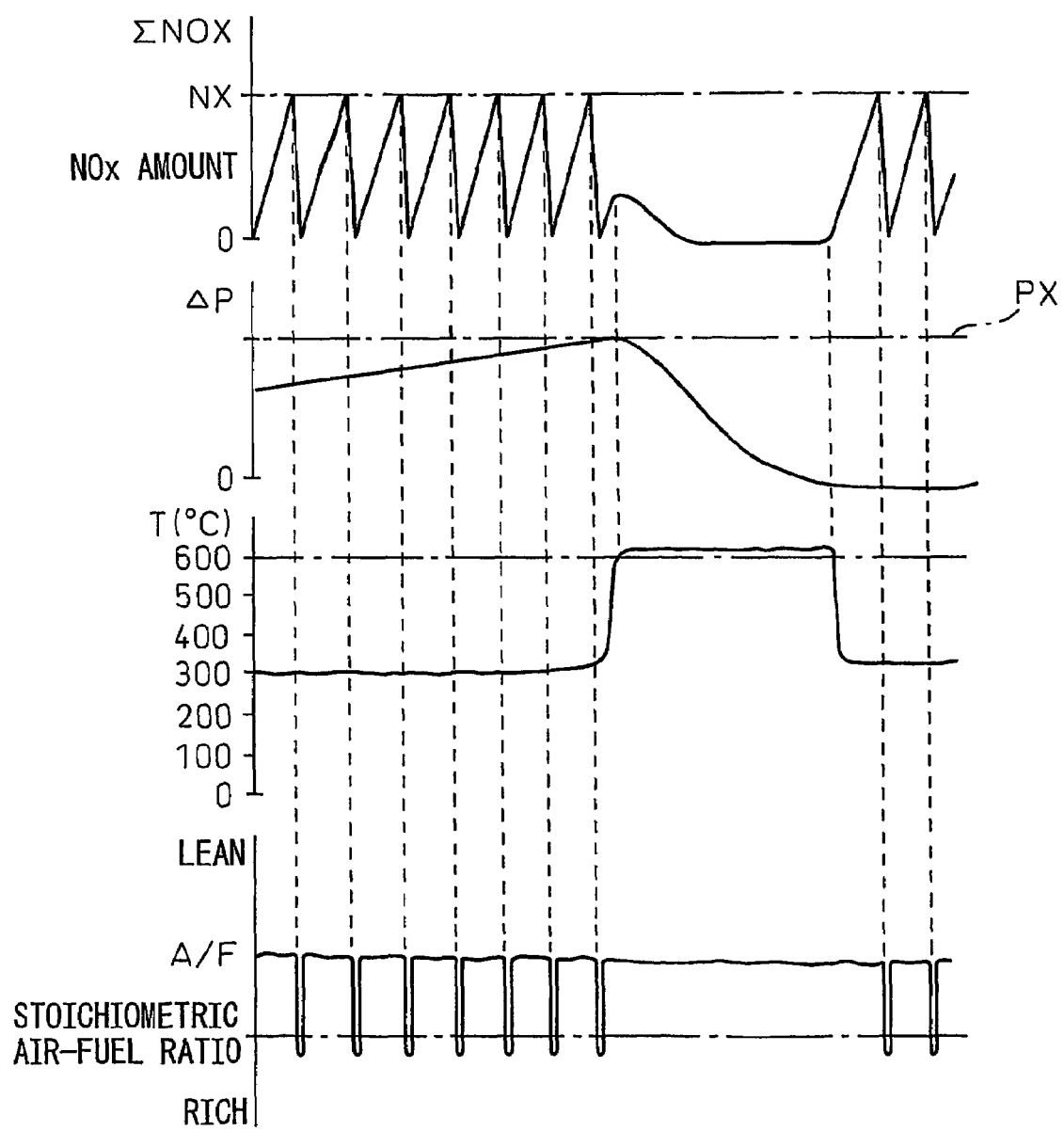
FIG. 15 is a time chart of temperature raising control of a particulate filter.
Figure 17A:
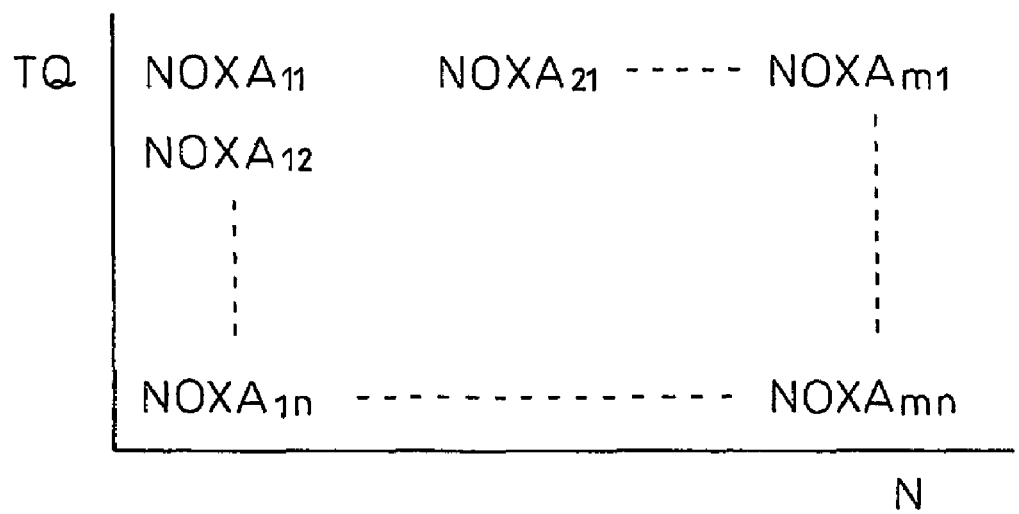
FIGS. 17A and 17B are views of a stored $NO_x$ amount NOXA map etc.

In this embodiment of the present invention, the amount NOXA of $NO_x$ stored per unit time in the $NO_x$ storing catalyst 12 is stored as a function of the required torque TQ and the engine speed N in the form of the map shown in FIG. 17A in advance in the ROM 32. By cumulatively adding this $NO_x$ amount NOXA, the amount $\Sigma NOX$ of $NO_x$ stored in the $NO_x$ storing catalyst 11 is calculated. In this embodiment of the present invention, as shown in FIG. 15, each time the $NO_x$ amount $\Sigma NOX$ reaches the allowable value NX, the air-fuel ratio A/F of the exhaust gas flowing into the $NO_x$ storing catalyst 12 is made temporarily rich, whereby $NO_x$ is released from the $NO_x$ storing catalyst 12.

Note that when making the air-fuel ratio A/F of the exhaust gas flowing into the $NO_x$ storing catalyst 12 rich, the air-fuel ratio of the exhaust gas flowing into the $SO_x$ trap catalyst 11 must be maintained lean. Therefore, in this embodiment of the present invention, a reducing agent supply device, for example, as shown in FIG. 1 to FIG. 3, a reducing agent supply valve 14, is arranged in the exhaust passage between the $SO_x$ trap catalyst 11 and the $NO_x$ storing catalyst 12. By supplying reducing agent into the exhaust passage from the reducing agent supply valve 14 when $NO_x$ should be released from the $NO_x$ storing catalyst 12, the air-fuel ratio of the exhaust gas flowing into the $NO_x$ storing catalyst 12 is temporarily made rich.

On the other hand, the particulate matter contained in the exhaust gas is trapped on the particulate filter 12a carrying the $NO_x$ storing catalyst 12 and successively oxidized. However, if the amount of the particulate matter trapped becomes greater than the amount of the particulate matter oxidized, the particulate matter will gradually deposit on the particulate filter 12a. In this case, if the deposition of particulate matter increases, it is necessary to remove the deposited particulate matter. In this case, if raising the temperature of the particulate filter 12a under an excess of air to about 600° C., the deposited particulate matter is oxidized and removed.

Therefore, in this embodiment of the present invention, when the amount of the particulate matter deposited on the particulate filter 12a exceeds the allowable amount, the temperature of the particulate filter 12a is raised under a lean air-fuel ratio of the exhaust gas and thereby the deposited particulate matter is removed by oxidation. Specifically speaking, in this embodiment of the present invention, when the differential pressure ΔP before and after the particulate filter 12a detected by the differential pressure sensor 23 exceeds the allowable value PX as shown in FIG. 15, it is judged that the amount of deposited particulate matter has exceeded the allowable amount. At that time, the air-fuel ratio of the exhaust gas flowing into the particulate filter 12a is maintained lean and the temperature T of the particulate filter 12a is raised in the temperature raising control. Note that if the temperature T of the particulate filter 12a becomes high, the amount of $NO_x$ ΣNOX trapped falls due to release of $NO_x$ from the $NO_x$ storing catalyst 12.

When the particulate filter 12a should be raised in temperature, the $SO_x$ trap catalyst 11 does not have to be raised in temperature. Therefore, when raising the temperature of the particulate filter 12a, reducing agent is supplied from the reducing agent supply valve 14 in the range at which the air-fuel ratio of the exhaust gas can be maintained lean and the heat of the oxidation reaction of the reducing agent is used to raise the temperature T of the particulate filter 12a.

On the other hand, when the $SO_x$ trap rate by the $SO_x$ trap catalyst 11 is 100 percent, no $SO_x$ at all flows into the $NO_x$ storing catalyst 12. Therefore, in this case, there is absolutely no danger of $SO_x$ being stored in the $NO_x$ storing catalyst 12. As opposed to this, when the $SO_x$ trap rate is not 100 percent, even if the $SO_x$ trap rate is close to 100 percent, $SO_x$ is stored in the $NO_x$ storing catalyst. However, in this case, the amount of $SO_x$ stored in the $NO_x$ storing catalyst 12 per unit time is extremely small. This being said, if a long time passes, a large amount of $SO_x$ will be stored in the $NO_x$ storing catalyst 12. If a large amount of $SO_x$ is stored, the stored $SO_x$ has to be made to be released.

Figure 16:
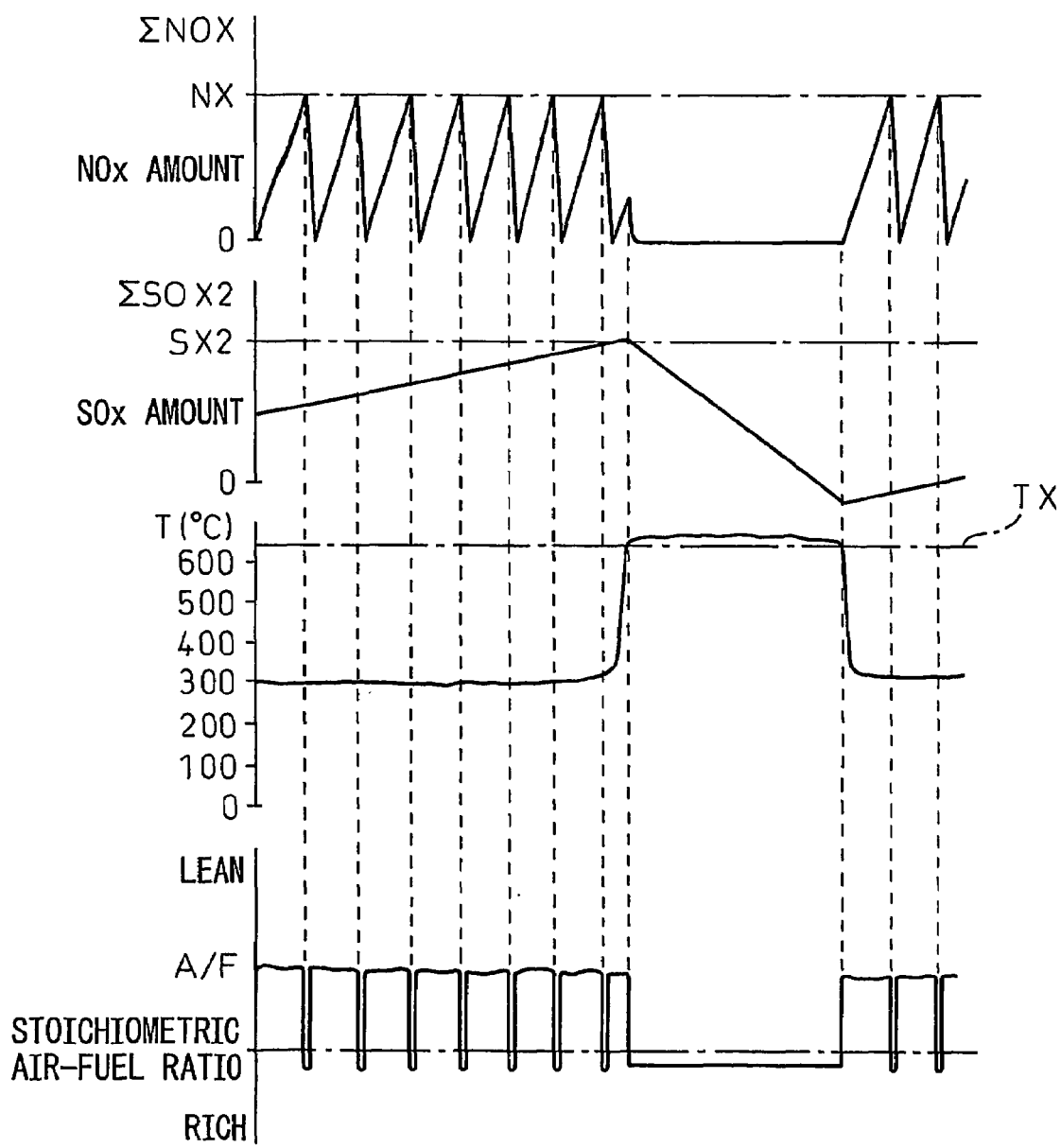
FIG. 16 is a time chart of $SO_x$ release control.
Figure 17B:
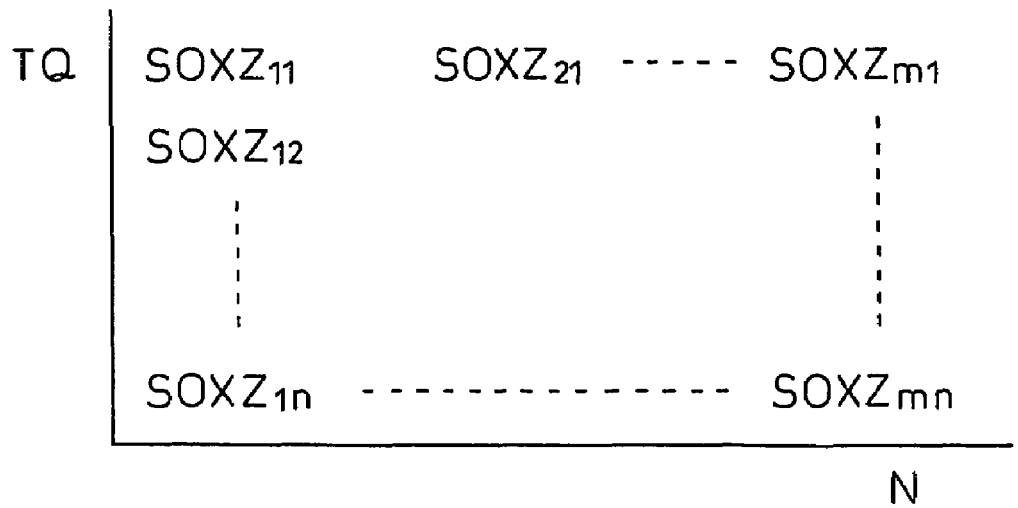

As explained above, to get the $SO_x$ released from the $NO_x$ storing catalyst 12, it is necessary to make the temperature of the $NO_x$ storing catalyst 12 rise to the $SO_x$ release temperature and make the air-fuel ratio of the exhaust gas flowing into the $NO_x$ storing catalyst 12 rich. Therefore, in this embodiment of the present invention, as shown in FIG. 16, when the amount ΣSOX2 of $SO_x$ stored in the $NO_x$ storing catalyst 12 reaches the allowable value SOX2, the temperature T of the $NO_x$ storing catalyst 12 is made to rise to the $NO_x$ release temperature TX and the air-fuel ratio of the exhaust gas flowing into the $NO_x$ storing catalyst 12 is made rich. Note that the amount SOXZ of $SO_x$ stored in the $NO_x$ storing catalyst 12 per unit time is stored as a function of the required torque TQ and the engine speed N in the form of a map as shown in FIG. 17B in advance in the ROM 32.

By cumulatively adding this amount SOXZ of $SO_x$, the stored $SO_x$ amount ΣSOX2 is calculated.

When releasing $SO_x$ from the $NO_x$ storing catalyst 12, if making the air-fuel ratio of the exhaust gas flowing into the $SO_x$ trap catalyst 11 rich, the $SO_x$ trapped in the $SO_x$ trap catalyst 11 will be released from the $SO_x$ trap catalyst 11 and the released $SO_x$ will end up being stored in the $NO_x$ storing catalyst 12. Therefore, when releasing $SO_x$ from the $NO_x$ storing catalyst 12, it is not possible to make the air-fuel ratio of the exhaust gas flowing into the $SO_x$ trap catalyst 11 rich. Accordingly, in this embodiment according to the present invention, when $SO_x$ should be released from the $NO_x$ storing catalyst 12, first the air-fuel ratio of the exhaust gas flowing into the $SO_x$ trap catalyst 11 and the $NO_x$ storing catalyst 12 is maintained lean and a reducing agent is supplied from the reducing agent supply valve 14 to raise the temperature T of the $NO_x$ storing catalyst 12 up to the $NO_x$ release temperature TX, then the air-fuel ratio of the exhaust gas flowing into the $SO_x$ trap catalyst 11 is maintained lean and the amount of supply of reducing agent from the reducing agent supply valve 14 is increased to make the air-fuel ratio of the exhaust gas flowing into the $NO_x$ storing catalyst 12 rich. Note that in this case, it is also possible to alternately switch the air-fuel ratio of the exhaust gas flowing into the $NO_x$ storing catalyst 12 between rich and lean.

Figure 18:
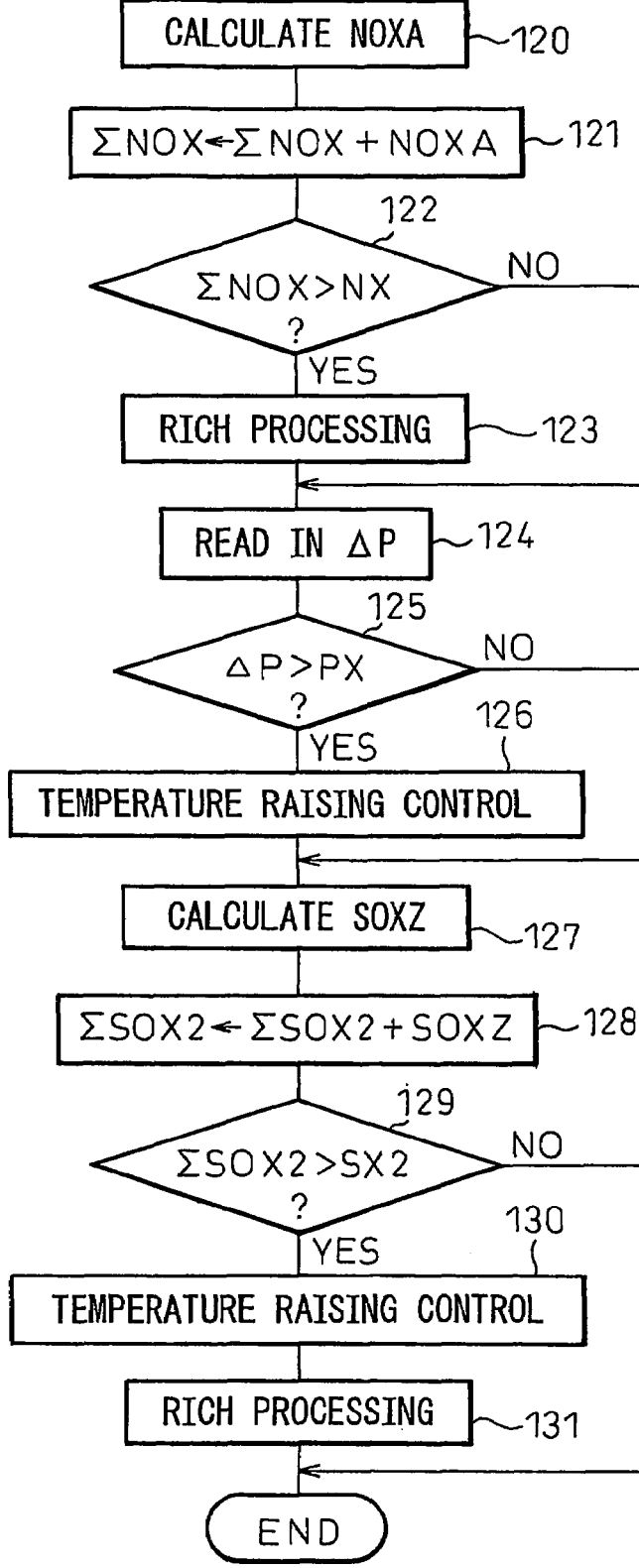
FIG. 18 is a flow chart for execution of processing for the $NO_x$ storing catalyst.

FIG. 18 shows the processing routine for the $NO_x$ storing catalyst 12.

Referring to FIG. 18, first, at step 120, the amount NOXA of $NO_x$ absorbed per unit time is calculated from the map shown in FIG. 17A. Next, at step 121, this NOXA is added to the $NO_x$ amount ΣNOX stored in the $NO_x$ storing catalyst 12. Next, at step 122, it is judged if the stored $NO_x$ amount ΣNOX has exceeded the allowable value NX. When ΣNOX>NX, the routine proceeds to step 123, where rich processing is performed to switch the air-fuel ratio of the exhaust gas flowing into the $NO_x$ storing catalyst 12 by the reducing agent supplied from the reducing agent supply valve 14, temporarily from lean to rich and ΣNOX is cleared.

Next, at step 124, the differential pressure sensor 23 is used to detect the differential pressure ΔP before and after the particulate filter 12a. Next, at step 125, it is judged if the differential pressure ΔP has exceeded the allowable value PX. When ΔP>PX, the routine proceeds to step 126, where temperature raising control of the particulate filter 12a is performed. This temperature raising control is performed by maintaining the air-fuel ratio of the exhaust gas flowing into the particulate filter 12a lean and supplying reducing agent from the reducing agent supply valve 14.

Next, at step 127, the $SO_x$ amount SOXZ stored per unit time is calculated from the map shown in FIG. 17B. Next, at step 128, this SOXZ is added to the $SO_x$ amount ΣSOX2 stored in the $NO_x$ storing catalyst 12. Next at step 129, it is judged if the stored $SO_x$ amount ΣSOX2 has exceeded the allowable value SX2. When ΣSOX2>SX2, the routine proceeds to step 130, where the air-fuel ratio of the exhaust gas flowing into the $NO_x$ storing catalyst 12 is maintained lean and reducing agent is supplied from the reducing agent supply valve 14 to raise the temperature T of the $NO_x$ storing catalyst 12 to the $SO_x$ release temperature TX in temperature raising control. Next, at step 131, the reducing agent supplied from the reducing agent supply valve 14 is used to maintain the air-fuel ratio of the exhaust gas flowing into the $NO_x$ storing catalyst 12 rich in the rich processing and the ΣSOX2 is cleared.

The invention claimed is:

1. An exhaust purification device for a compression ignition type internal combustion engine having an $SO_x$ trap catalyst arranged in an engine exhaust passage and adapted for trapping $SO_x$ contained in exhaust gas and having an $NO_x$ storing catalyst arranged in the exhaust passage downstream of the $SO_x$ trap catalyst, the $NO_x$ storing catalyst storing $NO_x$ contained in exhaust gas when the air-fuel ratio of the inflowing exhaust gas is lean and releasing the stored $NO_x$ when the air-fuel ratio of the exhaust gas flowing in becomes the stoichiometric air-fuel ratio or rich, wherein said $SO_x$ trap catalyst traps $SO_x$ contained in the exhaust gas when the air-fuel ratio of the exhaust gas flowing into the $SO_x$ trap catalyst is lean, has the property that the trapped $SO_x$ gradually diffuses inside the $SO_x$ trap catalyst when the temperature of the $SO_x$ trap catalyst rises under a lean air-fuel ratio of the exhaust gas, and has the property of releasing the trapped $SO_x$ when the air-fuel ratio of the exhaust gas flowing into the $SO_x$ trap catalyst becomes rich if the temperature of the $SO_x$ trap catalyst is the $SO_x$ release temperature or more; said device is provided with air-fuel ratio control means continuing to maintain the air-fuel ratio of the exhaust gas flowing into the $SO_x$ trap catalyst lean, without allowing said exhaust gas to become rich, during engine operation and estimating means for estimating an $SO_x$ trap rate showing a ratio of $SO_x$ trapped and the $SO_x$ trap catalyst in the $SO_x$ contained in the exhaust gas; and said device makes the temperature of the $SO_x$ trap catalyst rise under a lean air-fuel ratio of the exhaust gas when the $SO_x$ trap rate falls below a predetermined rate so as to thereby restore the $SO_x$ trap rate.

2. An exhaust purification device as set forth in claim 1, wherein said $SO_x$ trap catalyst is comprised of a coated layer formed on a catalyst carrier and a precious metal catalyst maintained on the coated layer and the coated layer contains diffused in said coated layer an alkali metal, alkali earth metal, or rare earth metal.

3. An exhaust purification device as set forth in claim 1, wherein the amount of $SO_x$ trapped in said $SO_x$ trap catalyst is estimated, it is judged that the $SO_x$ trap rate has fallen below a predetermined rate when the amount of $SO_x$ trapped in the $SO_x$ trap catalyst exceeds a predetermined amount, and the $SO_x$ trap rate is restored at that time by raising the temperature of the $SO_x$ trap catalyst under a lean air-fuel ratio of the exhaust gas.

4. An exhaust purification device as set forth in claim 3, wherein said predetermined amount is increased along with an increase in the number of times of processing for restoring the $SO_x$ trap rate and the ratio of increase of the predetermined amount is reduced the greater the number of times of processing.

5. An exhaust purification device as set forth in claim 1, which arranges in an exhaust gas passage downstream of the $SO_x$ trap catalyst an $SO_x$ sensor able to detect a concentration of $SO_x$ in exhaust gas and calculates the $SO_x$ trap rate from an output signal of said $SO_x$ sensor.

6. An exhaust purification device as set forth in claim 5, wherein it is judged that the $SO_x$ trap rate has fallen below a predetermined rate when the concentration of $SO_x$ in exhaust gas detected by the $SO_x$ sensor exceeds a predetermined concentration and at that time, the $SO_x$ trap rate is restored by raising the temperature of the $SO_x$ trap catalyst under a lean air-fuel ratio of the exhaust gas.

7. An exhaust purification device as set forth in claim 1, which a reducing agent supply device is arranged in an exhaust gas passage between the $SO_x$ trap catalyst and $NO_x$ storing catalyst and, when $NO_x$ should be released from the $NO_x$ storing catalyst, reducing agent is fed from the reducing agent supply device to the inside of the exhaust passage to temporarily make the air-fuel ratio of the exhaust gas flowing into the $NO_x$ storing catalyst rich.

8. An exhaust purification device as set forth in claim 7, which, when $SO_x$ is stored in the $NO_x$ storing catalyst, the temperature of the $NO_x$ storing catalyst is raised to the $SO_x$ release temperature and reducing agent is fed from the reducing agent supply device to the inside of the exhaust passage to make the air-fuel ratio of the exhaust gas flowing into the $NO_x$ storing catalyst rich.

9. An exhaust purification device as set forth in claim 1, wherein the $NO_x$ storing catalyst is carried on a particulate filter for trapping and oxidizing particulate matter contained in the exhaust gas.

10. An exhaust purification device as set forth in claim 9, which the temperature of the particulate filter is raised under a lean air-fuel ratio of the exhaust gas when the amount of particulate matter deposited on the particulate filter exceeds an allowable amount to remove the deposited particulate matter by oxidation.

* * * * *